Patented Feb. 11, 1936

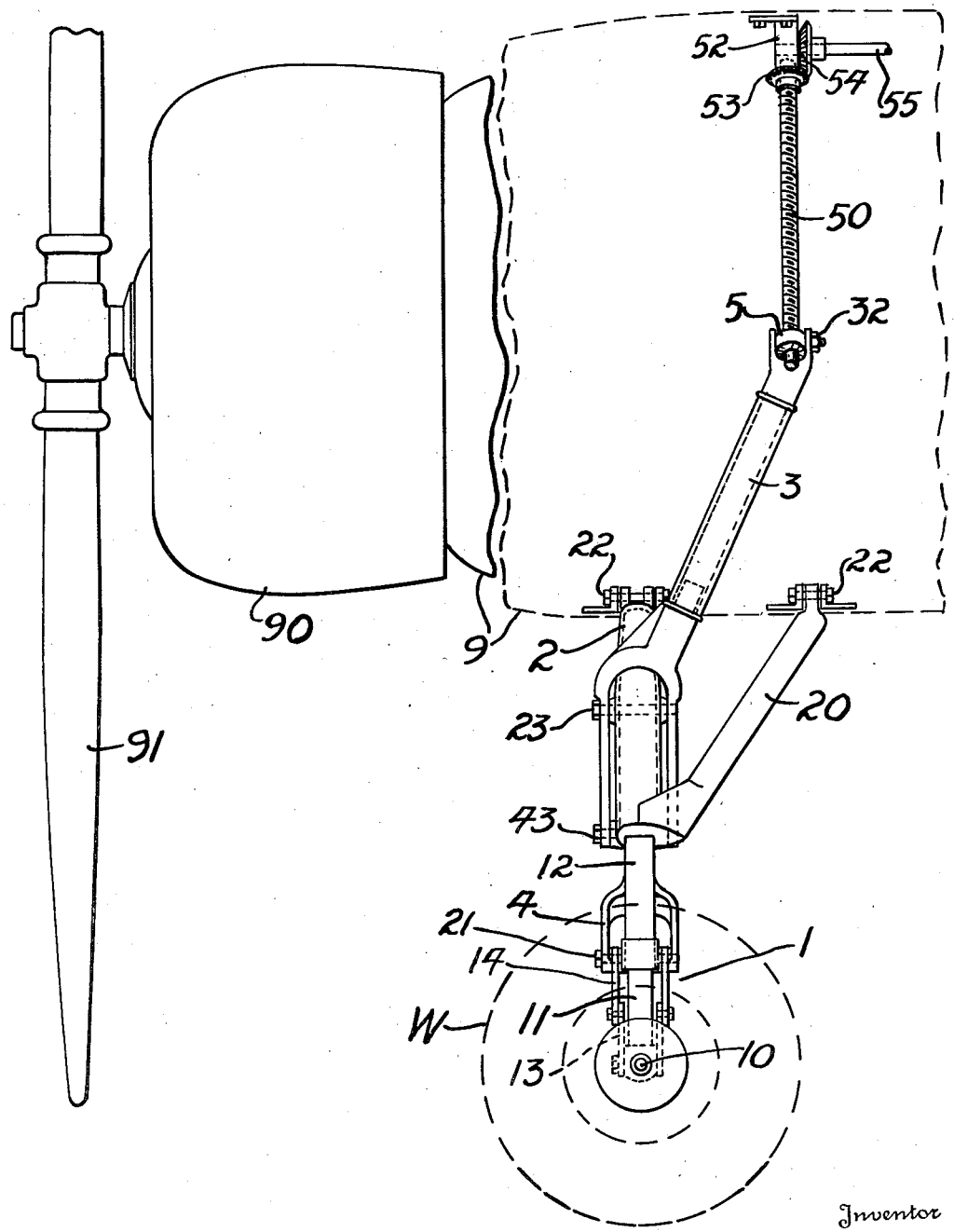

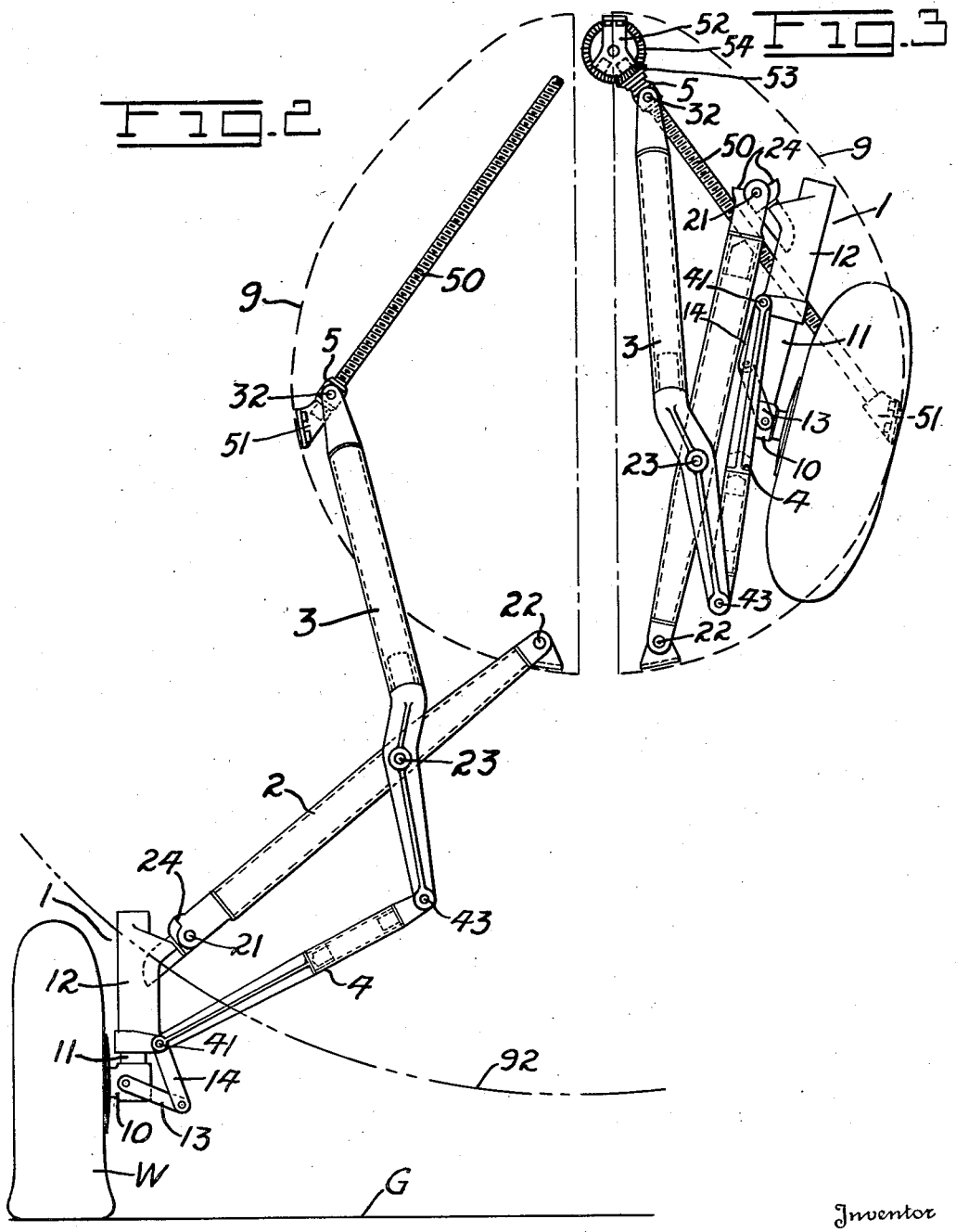

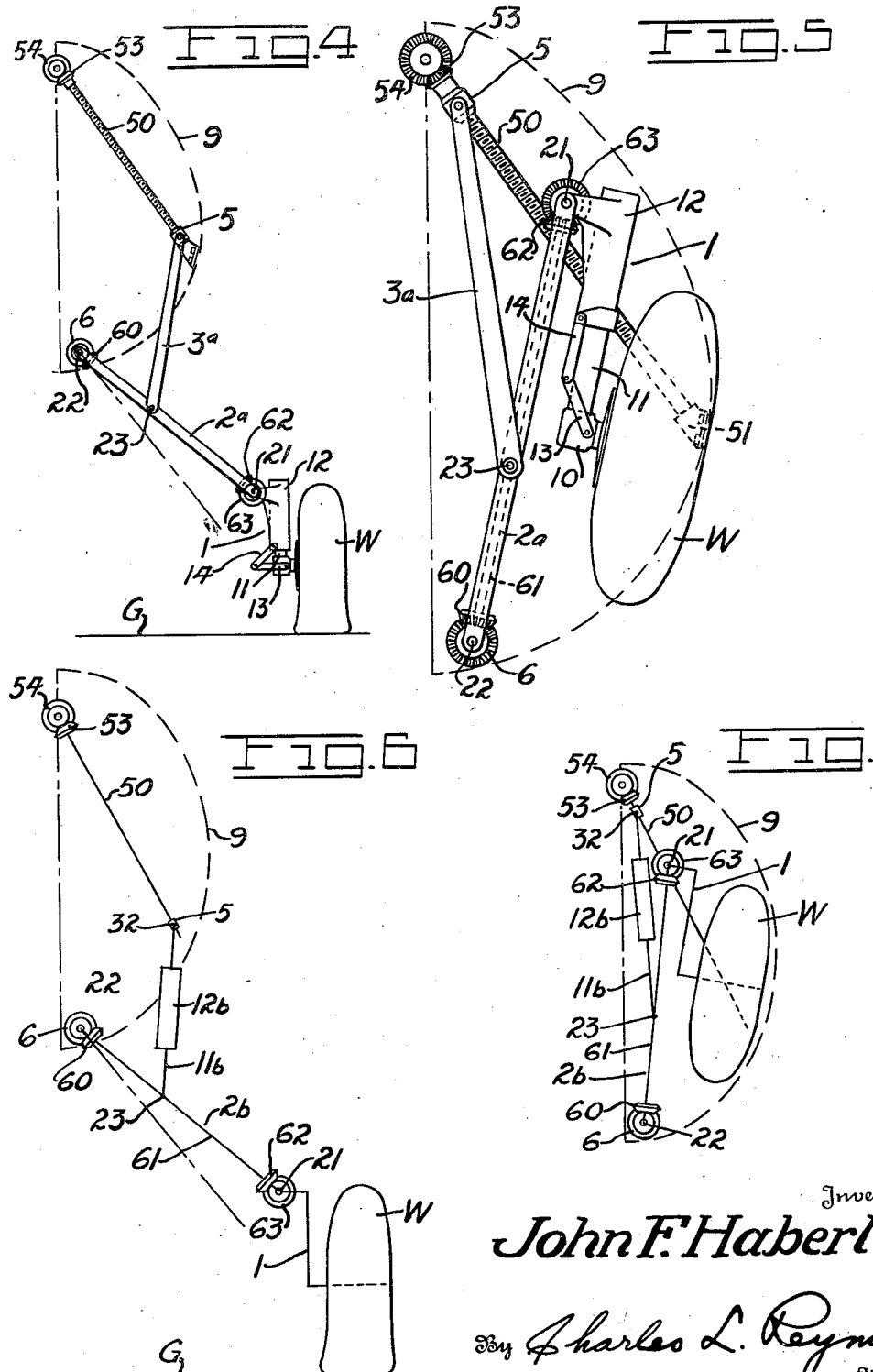

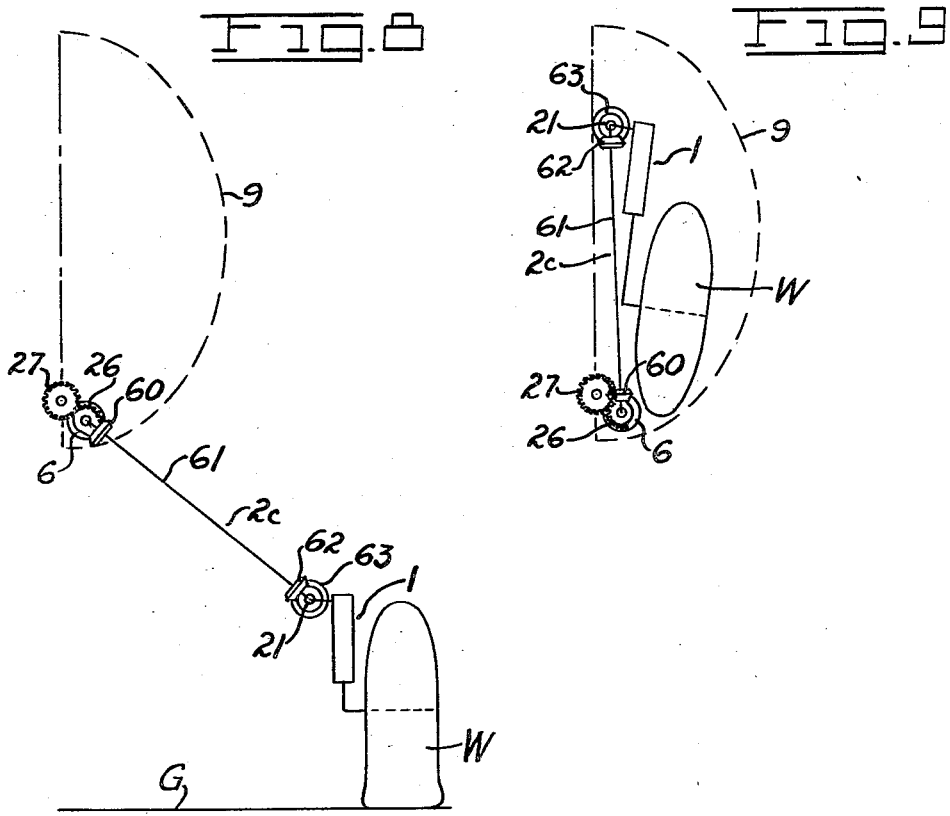

2,030,293

UNITED STATES PATENT OFFICE 2,030,293

RETRACTABLE LANDING GEAR FOR GEARED PROPELLER AIRPLANES

John F. Haberlin, Seattle, Wash., assignor to Boeing Airplane Company, Seattle, Wash., a corporation of Washington Application July 24, 1934, Serial No. 736,699

12 Claims. (Cl. 244—2)

My invention relates to landing gears for airplanes, of a type to be retracted substantially wholly within the fuselage, yet which has a greater extension than is usual, so that an extra long propeller may be used, such as is generally used when the propeller is geared to the engine.

The advantages of geared propellers, which can operate at slower speed than direct-connected propellers, and which are made longer than a direct-connected propeller, are recognized, but such propellers on small planes make it necessary to provide landing gear of greater length than the ordinary landing gear, in order that the propeller may have sufficient ground clearance in taking off and landing and while taxiing. Landing gear of such length as this, constructed according to known designs, is not readily retractable wholly within the airfoil contour of the plane. If such landing gear is swung forward or backward it disturbs materially the balance of the plane, particularly if the plane itself be small and light, by displacing the center of gravity while in flight. It is therefore a primary object of the invention to provide a landing gear which will extend downward sufficiently to give clearance to such a long propeller, which can be retracted wholly within the streamline contour of the airplane, as for example into the fuselage, and which in retracting will not alter the center of gravity of the plane. It is, of course, an object to provide such a landing gear which will be sufficiently rigid in use to resist all types of stresses placed upon it in taxiing and landing.

It is a further object to provide such a landing gear into which can be incorporated a shock absorbing unit or units, such as an oleo unit.

It is a further object to provide such a landing gear which will be simple in construction and reliable in operation, and one which will require the minimum space for storage in the retracted position, and one which when retracted will not interfere with the firing of fixed guns.

With these and other objects in mind, as will appear hereinafter, my invention comprises the novel parts, and the novel combination and arrangement thereof, as shown in the accompanying drawings, and as will be hereinafter described and more particularly defined by the appended claims.

In the accompanying drawings I have shown my landing gear, in association with a plane and propeller, as now preferred by me, it being understood that the assembly thereof into the plane and the relationship and form of the parts may be varied in accordance with the principles which will appear from this specification.

Figure 1 is a side elevation of the landing gear in fully extended position, such as it would occupy immediately prior to landing or after taking off, the related parts of the plane being shown in conjunction therewith.

Figure 2 is a front elevation of the landing gear, shown in the position parts would assume in taking the landing load, and Figure 3 is a view similar to Figure 2 showing the landing gear fully retracted.

Figure 4 is a diagrammatic showing, similar to Figure 2, of a modified form of landing gear in the extended position, and Figure 5 is a view similar to Figure 3, showing this type in retracted position.

Figures 6 and 7 correspond to Figures 4 and 5, showing a further modification, and Figures 8 and 9 similarly correspond to Figures 4 and 5, showing a still further modified form.

The fuselage of the plane is indicated at 9, chiefly in dotted lines, and at its nose there is shown mounted upon it an engine enclosed within a cowl 90. A propeller 91 is mounted in any usual manner, connected to the engine by gearing (not shown), but it will be noted that the propeller is of a length considerably in excess of the average diameter of the fuselage, and that its tip sweeps through a path, indicated by the dot and dash line 92 in Figure 2, which is in the neighborhood of twice the diameter of the cross section of the fuselage. The fuselage must, therefore, be elevated considerably above the ground line G, and the landing gear must be of a type which will hold the fuselage thus elevated, yet which will retract wholly within the fuselage.

While I speak of the fuselage, because this landing gear is designed for use upon pursuit planes, it will be evident that the member 9 might, in some instances, be some other streamlined part of the airplane, for instance a wing nacelle, hence while the term fuselage is used, it is to be understood as meaning any convenient part of the airplane structure.

The wheel W, which, of course, might be replaced by a ski or other landing device, is mounted upon a mounting, generally designated by the numeral 1, and which in this instance comprises a spindle body 10 and relatively movable oleo elements 11 and 12. To prevent relative torsional movement of the parts of the oleo, any suitable means may be provided, for example the links 13 and 14 pivotally connected together, one of which is connected to the element 11 or the spindle body 10, which is rigidly mounted thereon, and the other being connected to the member 12.

Supporting the wheel mounting 1 from the fuselage in the form shown in Figures 1, 2, and 3, are two crossed struts 2 and 3. Preferably the strut 2 is formed as a V strut, the drag element 20 of which extends rearwardly of the main element 2, and the struts 2 and 3 are pivoted together intermediate their ends at the point 23. In effect these crossed and pivotally connected struts 2 and 3 effect a scissors-like movement relative to each other in retracting and extending, the strut 2 and its drag strut 20 being fixedly pivotally connected at 22 upon the fuselage, and the strut 3 being pivotally connected at 32, within the fuselage, upon a member 5 which is displaceable within the fuselage. The member 5 may conveniently be a nut threaded upon a screw 50, the screw being rotatable.

In the extended position the strut 2 extends generally outwardly and downwardly from the fuselage to a pivotal connection at 21 to the upper part of the mounting 1. Cooperating stop elements, such as the shoulders indicated at 24, permit movement only in one direction and prevent relative pivotal movement under landing stresses, being assisted in this by a link 4 which connects the lower arm of the upright strut 3 from a point 43 to the wheel mounting 1 at the point 41, spaced somewhat below the point 21. The link 4 is generally parallel to the strut 2, and so long as the strut 3 is held rigid the link 4 prevents pivotal movement of the wheel mounting 1 relative to the strut 2 about the pivot at 21, and as pointed out, the cooperating stop shoulders at 24 assist in preventing any pivotal movement under landing stresses.

The screw 50 is journaled within the fuselage, bearings 51 and 52 being shown as typical of such a mounting. The screw extends in general parallel to the extended position of the strut 2, and upon its rotation, with the landing gear in the extended position of Figures 1 and 2, the nut 5 is moved away from the wheel mounting, but thereby effects a scissors-like relative movement of the struts 2 and 3 until, by the time the nut has reached the upper end of the screw, the struts 2 and 3 lie close together. The link 4, during this movement, maintains the wheel mounting 1 generally upright, and controls its movement, until the wheel, in the final retracted position of the nut, lies substantially within the fuselage, there being a recess provided into which the struts and wheel may move. This position of the parts is shown in Figure 3.

If the screw 50 were aligned with the struts 2 and 3, with the proportions of their arms as shown, the end of the screw would tend to interfere with movement of the wheel W into its recess, and to avoid this the screw is preferably displaced longitudinally of the airplane (as shown, to the rear), and the upper arm of the strut 3 is similarly displaced as may be seen in Figure 1, and with this arrangement of the parts the wheel is free to move into the recess past the end of the screw 50 without interference.

Longitudinal stresses are taken by the V struts 2, 20, and vertical stresses by the linkage formed by the struts 2 and 3 and the link 4, and since the nut 5 is irreversible on its screw, the upper end of the upright strut 3 is in effect fixed in any given position. It may be noted, too, that the wheel is maintained substantially upright throughout its movement, and it will therefore be possible to land upon it in substantially any position between wholly extended and retracted positions.

Any convenient means of rotating the screw 50 or the two screws, one at each side of the plane, may be employed. To this end I have illustrated gears 53 upon each screw meshing with a common gear 54 which is mounted upon a shaft 55. This shaft may be operated by an electric motor or other power means, and may also be provided with manual means for operation in case of failure of the power means. Since such arrangements are common in the art I have not illustrated them, and it will be understood that any suitable means may be employed for operating the retracting gear.

In Figures 4 to 9 inclusive have been illustrated various modifications in which the link 4 is omitted, and swinging of the strut 2a, 2b or 2c into an upwardly extending position from its pivot 22 is accomplished by means other than the parallel link arrangement of Figures 1 to 3 inclusive, while at the same time means are incorporated for swinging the wheel W back alongside the strut which is connected to the wheel mounting, so that the wheel, in movement between retracted and extended position, remains always substantially parallel to its plane when fully extended.

In Figures 4 and 5 the strut 2a is braced and controlled in its movement by a strut 3a pivoted thereto at 23, but for holding the wheel mounting 1 in an upright position, and for controlling its swinging movement about the pivot 21, reliance is placed upon a geared arrangement consisting of the fixed gear 6, which in effect is a fixed circular rack, a pinion 60 meshing therewith and mounted upon a shaft 61 incorporated within or extending along the strut 2a, a pinion 62 upon the swinging end of the strut and upon this shaft 61, in turn meshing with a gear 63 which is fixed to the wheel mounting 1.

As the nut 5 moves upwardly, drawing the brace 3a with it, the strut 2a swings upwardly, and this rotates the shaft 61 and thereby causes swinging of the wheel mounting 1 relatively to the strut 2a, so as to maintain the wheel substantially parallel to its initial position before commencing retraction. By suitable designing of the several gears 6 to 63 the wheel may be caused to swing a little more or a little less than the angular movement of the strut 2a, as may be desirable to bring the wheel substantially flush with the skin of the fuselage 9.

In this form it will be noted that the shock absorber 11, 12 is incorporated within the wheel mounting, hence when parts are extended the whole strut structure is rigid, and the shock absorber will absorb the landing and taxiing stresses.

In Figure 6 a similar arrangement is shown except that the shock absorber 11b and 12b is connected between the nut 5 and the strut 2b. The gear arrangement between the fuselage and the wheel mounting is the same as that described in connection with Figures 4 and 5, employing the gear 6, pinion 60, shaft 61, pinion 62, and gear 63 as before, but because it is necessary to permit the strut 2b to swing in absorbing the landing stresses, and it is not desirable that the wheel mounting shall swing at such times about its pivot 21, arrangements are provided, such as a simple clutch, to free the gear 6 when the landing gear is extended, so that oscillation of the strut may take place without causing rotation of the shaft 61, and this clutch is reengaged upon the initiation of the retracting movement. Arrangements may also be made, if desired, for locking the pinion 60 to the gear 6 when the landing gear is extended. Since these involve simple clutching arrangements, the character of which is obvious, it has not been deemed necessary to illustrate these in the diagrams.

In Figures 8 and 9 the strut 2c is not provided with any intermediate brace. At its inner or fuselage end it is provided with gear teeth, indicated at 26, in mesh with which is a retracting gear 27. The strut still carries the shaft 61 with its pinions 60 and 62, and the fuselage carries the gear 6 and the wheel mounting the gear 63, as in the previous diagram. The shock absorber in this form is incorporated in the wheel mounting.

Parts are held rigidly in extended position by the intermeshing of the gears 26 and 27 or any equivalent means, and yieldability is obtained through the use and mounting of the shock absorber. When it is desired to retract the landing gear the gear 27 is rotated, causing the entire strut 2c to swing upward, carrying the wheel mounting, and the shaft 61 is thereby caused to rotate, swinging back the wheel mounting until it lies alongside the strut 2c.

What I claim as my invention is:

1. In combination, in a retractable landing gear, a wheel mounting, two crossed and pivotally connected struts, one end of one strut being fixedly pivoted, and its opposite end being pivotally secured to the wheel mounting, means connecting an end of the second strut to the wheel mounting, to control movement of the latter in cooperation with the first strut, and means for moving the opposite end of the second strut away from the wheel mounting to swing the first strut and the wheel mounting upwardly.

2. In combination, in a retractable landing gear, a wheel mounting, two crossed and pivotally connected struts, one end of one strut being fixedly pivoted, and its opposite end being pivotally connected to the upper end of the wheel mounting, one arm of the second strut extending below the first strut, a rigid member pivotally connected, respectively, to such end of the second strut, and to the wheel mounting below the connection thereto of the first strut, and means for moving the opposite end of the second strut away from the wheel mounting to swing the first strut and the wheel mounting upwardly.

3. In a retractable landing gear, in combination with a fuselage or the like, a wheel mounting, an inclined V-strut disposed in a plane located generally parallel to the longitudinal axis of the fuselage, and pivoted at its ends to the fuselage and to the wheel mounting, respectively, an upright strut crossing the V-strut and pivoted thereto, a link connecting the lower arm of the upright strut to the wheel mounting, a pivotal support for the upper arm of the upright strut, and means for displacing the latter pivotal support to effect scissors-like relative movement of the two struts.

4. In a retractable landing gear, in combination with a fuselage or the like, a strut pivoted at one end upon the fuselage, and extending thence outwardly and downwardly, an upright wheel mounting incorporating a shock absorber unit, to the upper end of which mounting the outer end of said strut is pivotally connected, an upright strut crossing the first and pivoted thereto, a pivotal support at the fuselage for the upper end of the upright strut, means to displace said pivotal support within the fuselage, to effect a scissors-like relative movement of the two struts into the fuselage, and a link connecting the lower end of the upright strut to the wheel mounting, below the connection thereto of the first strut, to maintain the mounting generally upright as the struts swing.

5. In a retractable landing gear, in combination with a fuselage or the like, a strut pivoted at one end upon the fuselage, and extending thence outwardly and downwardly, an upright wheel mounting incorporating a shock absorber unit, to the upper end of which mounting the outer end of said strut is pivotally connected, an upright strut crossing the first and pivoted thereto, a pivotal support at the fuselage for the upper end of the upright strut, means to displace said pivotal support within the fuselage, in a direction generally parallel to the initial position of the first strut, to effect a scissors-like relative movement of the two struts into the fuselage, and a link connecting the lower end of the upright strut to the wheel mounting, below the connection thereto of the first strut, to maintain the mounting generally upright as the struts swing.

6. In a retractable landing gear, in combination with a fuselage or the like, a strut pivoted at one end upon the fuselage, and extending thence outwardly and downwardly, an upright wheel mounting incorporating a shock absorber unit, to the upper end of which mounting the outer end of said strut is pivotally connected, cooperating stop means on the strut and mounting, to prevent relative pivotal movement thereof under the influence of landing shocks, an upright strut crossing the first and pivoted thereto, a pivotal support at the fuselage for the upper end of the upright strut, means to displace said pivotal support within the fuselage, to effect a scissors-like relative movement of the two struts into the fuselage, and a link connecting the lower end of the upright strut to the wheel mounting, below the connection thereto of the first strut, to maintain the mounting generally upright as the struts swing.

7. In combination with a fuselage and a propeller of considerable radius as compared to the fuselage, and mounted thereon, a scissors-like extension strut arrangement comprising two crossed and pivotally connected struts each mounted by one end upon the fuselage, a wheel mounting to which one strut is directly connected, and a link generally parallel to such strut and connecting the other strut and the wheel mounting, and means to displace the fuselage-mounted end of one strut to effect a scissors-like movement of the strut arrangement and a generally parallel movement of the wheel mounting, into the fuselage.

8. The combination of claim 7, the last-mentioned means comprising a transversely disposed screw mounted within the fuselage and a nut connected to the fuselage mounted end of the strut to be displaced, this end of the strut being offset longitudinally to locate the screw outside the retracted position of the wheel upon the wheel mounting.

9. In an airplane, in combination with a wheel and a mounting therefor, a strut pivotally mounted at its inner end and in extended position being inclined outwardly and downwardly to the wheel, and pivotally connected to the wheel mounting upon an axis parallel to the wheel's plane, means holding said strut rigidly to resist landing stresses, and operable to swing said strut upward about its inner end pivotal mounting, and means supported from said strut to swing the wheel mounting about the strut, to move the wheel into retracted position as the strut is swung, without substantial change in its plane relatively to the longitudinal axis of the airplane.

10. In combination, in a retractable landing gear, a wheel mounting, a strut pivotally mounted at its inner end and connected to said wheel mounting, in landing position being inclined outwardly and downwardly to the wheel, means engaging said strut to resist landing stresses, and operable to swing said strut about its inner end to move the wheel mounting to retracted position, and gear means cooperating between said strut and said mounting to swing the latter relatively to said strut.

11. In combination, in a retractable aircraft landing gear, a wheel mounting, a strut pivotally supported by its inner end from an aircraft and pivotally connected to said wheel mounting, a second strut pivotally connected to said first strut to hold the same in landing position inclined outwardly and downwardly to the wheel, means for moving said struts to swing the wheel mounting upwardly into retracted position, and means interengaged between one of said struts and the wheel mounting automatically operable to swing said wheel mounting with respect to said first strut upon upward retracting movement of the mounting.

12. In an airplane, in combination with a wheel and a mounting therefor, a strut pivotally supported at its inner end and pivotally connected to the wheel mounting, a member pivotally connected to said strut inwardly of the strut's outer end and operable to hold said strut in landing position inclined outwardly and downwardly to the wheel, and further operable to swing said strut upward about its inner end pivotal mounting to retracted position, and a second member extending between and pivotally connected to said first member and said wheel mounting, to swing the latter relatively to the strut as it is swung upward.

JOHN F. HABERLIN.